(12) United States Patent
Rodriguez-Amaya et al.

(10) Patent No.: US 7,789,069 B2
(45) Date of Patent: Sep. 7, 2010

(54) CHECK VALVE, AND INJECTOR WITH HYDRAULIC BOOSTER AND CHECK VALVE

(75) Inventors: Nestor Rodriguez-Amaya, Stuttgart (DE); Markus Leimser, Rudersberg-Steinenberg (DE); Michael Stengele, Schwenningen (DE); Andreas Theurer, Ludwigsburg (DE); Christoph Butscher, Leonberg (DE); Alexander Giehl, Kaiserlautern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/520,136

(22) PCT Filed: Jan. 2, 2008

(86) PCT No.: PCT/EP2008/050016

§ 371 (c)(1),
(2), (4) Date: Jun. 19, 2009

(87) PCT Pub. No.: WO2008/087051

PCT Pub. Date: Jul. 24, 2008

(65) Prior Publication Data

US 2010/0024774 A1 Feb. 4, 2010

(30) Foreign Application Priority Data

Jan. 17, 2007 (DE) .................. 10 2007 002 445

(51) Int. Cl.
*F02M 57/02* (2006.01)

(52) U.S. Cl. .................. 123/446; 137/533.11
(58) Field of Classification Search .................. 123/446, 123/457; 137/533.11, 533.15, 539; 251/284
See application file for complete search history.

(56) References Cited

U.S. PATENT DOCUMENTS

| 3,939,869 | A | * | 2/1976 | Clarke et al. | .................. | 137/595 |
| 4,945,945 | A | | 8/1990 | Schmid | | |
| 5,791,374 | A | * | 8/1998 | Black et al. | .................. | 137/519.5 |
| 6,029,685 | A | | 2/2000 | Carruth | | |
| 2004/0055580 | A1 | * | 3/2004 | Yamada et al. | .................. | 123/495 |
| 2006/0005815 | A1 | * | 1/2006 | Magel et al. | .................. | 123/446 |

FOREIGN PATENT DOCUMENTS

| DE | 4203161 | A1 | 8/1993 |
| DE | 19501725 | A1 | 8/1995 |
| DE | 102006010706 | A1 | 9/2007 |
| EP | 0268520 | A2 | 5/1988 |
| GB | 2287085 | A | 9/1995 |
| WO | 2007057255 | A1 | 5/2007 |

* cited by examiner

*Primary Examiner*—Stephen K Cronin
*Assistant Examiner*—J. Page Hufty
(74) *Attorney, Agent, or Firm*—Robert E. Greigg

(57) ABSTRACT

The invention relates to a check valve with a spherical valve element whose service life and operating reliability is considerably increased in relation to conventional check valves. The improved check valve is used in an injector for a fuel injection system of an internal combustion engine, having a hydraulic pressure booster.

14 Claims, 2 Drawing Sheets

CHECK VALVE, AND INJECTOR WITH HYDRAULIC BOOSTER AND CHECK VALVE

CROSS-REFERENCE TO RELATED APPLICATION

This application is a 35 USC 371 application of PCT/EP 2008/050016 filed on Jan. 2, 2008.

BACKGROUND OF THE INVENTION

1. Field of the Invention

The invention relates to a check valve and to an injector.

2. Description of the Prior Art

Such check valves are well known from the prior art. These check valves typically have a valve housing, in which a bore is made, and a valve seat is embodied in the bore. These check valves furthermore have a spherical valve member, which is disposed in the bore, and a stroke stop element for the valve member is provided, on which the valve member comes to rest when the check valve is open.

These check valves are suitable for many applications, but particularly in use in injectors with a hydraulic pressure booster, of the kind used in modern fuel injection systems for internal combustion engines, applications exist in which the conventional check valves have proven insufficiently durable. In conventional check valves, the lateral deflection of the valve member in the open position of the check valve has the effect that not until the valve member meets the valve seat is the valve member centered again by the valve seat. This leads to a relative motion between the valve member and the valve seat. This relative motion causes wear and shortens the service life of the valve seat and valve member considerably.

ADVANTAGES AND SUMMARY OF THE INVENTION

The check valve of the invention has the advantage that the valve member in the open state is centered in the indentation in the stroke stop element, and as a result, the valve member of the check valve of the invention strikes the valve seat precisely centrally when the check valve closes again, so that no significant wear between the valve seat and the valve member can be found. Moreover, in this exemplary embodiment, a valve spring can be dispensed with, which reduces the production costs and space required for the check valve of the invention considerably. Because of the reduced masses, this check valve responds especially fast. Because of the at least indirect axial fixation of the stroke stop element by means of a welded connection, no additional component is required for this, and as a result the production costs and space required for the check valve of the invention are likewise reduced.

In order to move the fuel past or through the valve member and the stroke stop element when the valve member is open, at least one transverse bore is provided in the stroke stop element, and the transverse bore connects an annular gap between the stroke stop element and the bore with a longitudinal bore in the stroke stop element. The longitudinal bore is preferably embodied as a throttle bore toward the indentation, and the transition from the indentation to the throttle bore is embodied with sharp edges, in order upon opening of the check valve to damp the motion of the valve member before it strikes the stroke stop element. The transition from the throttle bore to the region of the longitudinal bore remote from the indentation, by comparison, is embodied in streamlined fashion, to enable a rapid lifting of the valve member from the stroke stop element upon closure of the check valve.

The check valve of the invention can be used especially advantageously in an injector with a hydraulic pressure booster for an internal combustion engine.

BRIEF DESCRIPTION OF THE DRAWINGS

Further advantages will become apparent in the description of the preferred embodiment below in conjunction with the accompanying drawing, in which.

DESCRIPTION OF THE PREFERRED EMBODIMENT

Figure 1:
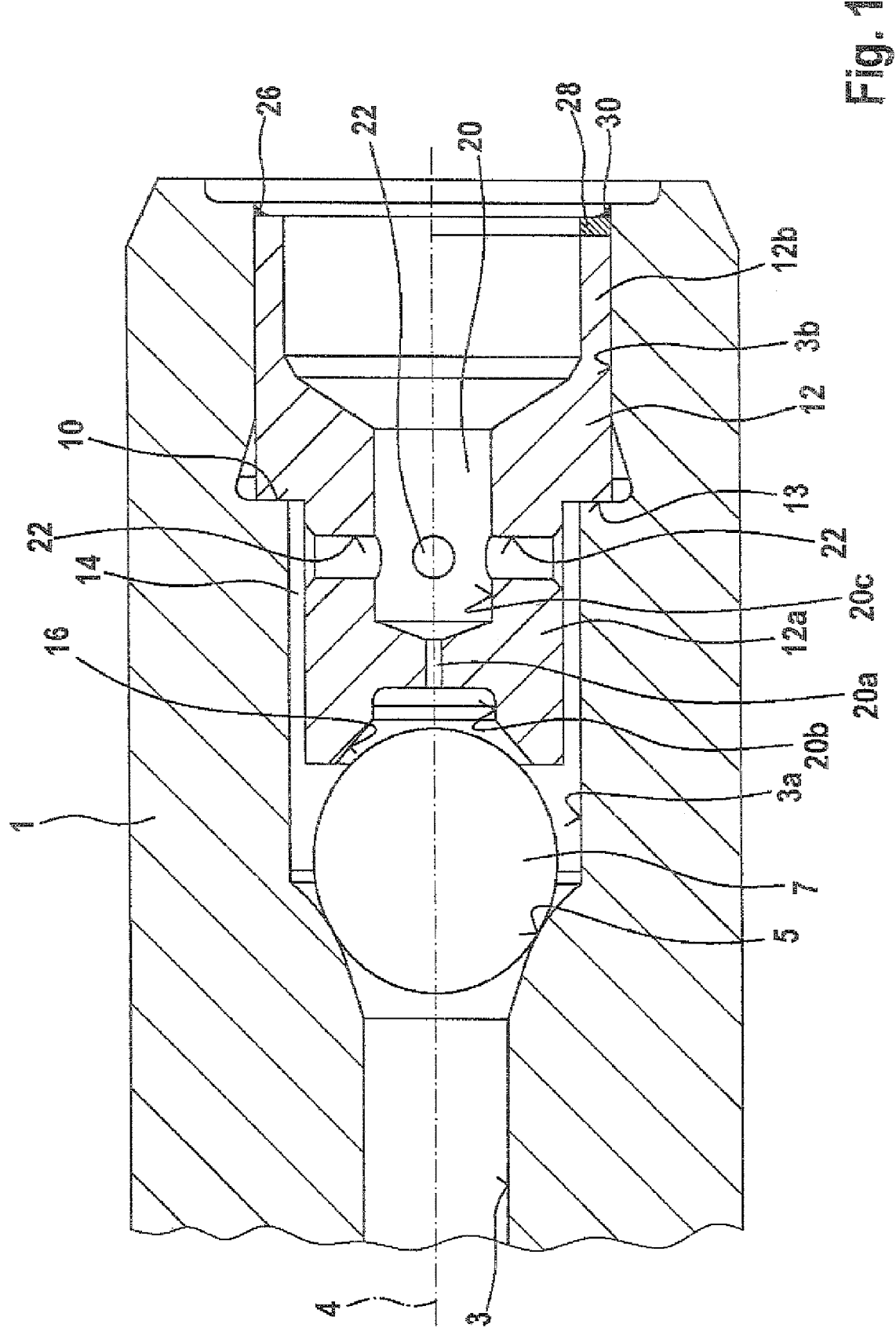
FIG. 1 is a longitudinal section through one exemplary embodiment of a check valve of the invention.

In FIG. 1, a component, which may for instance be a pressure booster piston of a hydraulic pressure booster, is identified by reference numeral 1. In this component 1, there is a check valve, described in further detail hereinafter, and the component 1 forms a valve housing for the check valve. In the valve housing 1, a stepped bore 3 is provided. A valve seat 5 is embodied between two portions of the bore 3 that have different diameters.

An at least approximately spherical valve member 7 is disposed in the bore 3. The valve member 7 cooperates with the valve seat 5 in the valve housing 1 and closes the check valve as soon as the valve member 7 rests on the valve seat 5. Adjoining the valve seat 5, the bore 3 has a portion 3a with a diameter that is somewhat greater than the diameter of the valve member 7. Toward the end of the valve housing 1, the bore 3 is open and has a portion 3b with a greater diameter compared to the portion 3a. Because of the change in diameter from the portion 3a to the portion 3b, an annular shoulder 10 facing away from the valve seat 5 is formed in the bore 3.

For limiting the opening stroke of the valve member 7, a stroke stop element 12 is inserted into the bore 3, from an open end of the valve housing 1. The stroke stop element 12 has a stepped diameter and has a portion 12a, disposed in the portion 3a of the bore 3, whose diameter is somewhat smaller than the diameter of the portion 3a of the bore 3, so that there is an annular gap 14 between the portion 12a of the stroke stop element 12 and the portion 3a of the bore 3. The stroke stop element 12 furthermore has a portion 12b, disposed in the portion 3b of the bore 3, with a greater diameter compared to the portion 12a. The diameter of the portion 12b of the stroke stop element 12 is only slightly less than the diameter of the portion 3b of the bore 3. As a result of the change in diameter of the stroke stop element 12, an annular shoulder 13 facing toward the valve seat 5 is formed on the stroke stop element.

On the side of the stroke stop element 12 toward the valve member 7, a funnel-shaped indentation 16 is made, which is embodied for instance as approximately frustoconical or domelike. The diameter of the indentation 16 is less than the diameter of the valve member 7, so that the valve member 7 can dip partway into the indentation 16. The indentation 16 is disposed at least approximately coaxially to the longitudinal axis 4 of the bore 3, and the valve member 7 is disposed at least coaxially in the bore 3 and is movable in the direction of the longitudinal axis 4.

A continuous longitudinal bore 20 with a multiply graduated diameter is made in the stroke stop element 12 and discharges on one end into the indentation 16 and on the other at the open end of the bore 3 on the stroke stop element 12. In its region extending toward the indentation 16, the longitudinal bore 20 has a small diameter and thus forms a throttle bore 20a. An orifice 20b of the longitudinal bore 20 into the indentation 16 has a substantially greater diameter than the throttle bore 20a. The transition from the orifice 20b into the throttle bore 20a is abrupt and is embodied with sharp edges, so that the flow, beginning at the indentation 16, into the throttle bore 20a is severely hindered. The throttle bore 20a is adjoined, on its side remote from the indentation 16, by a further region 20c of the longitudinal bore 20, which has a greater diameter than the throttle bore 20a. The transition from the region 20c of the longitudinal bore 20 to the throttle bore 20a is embodied in streamlined fashion; for instance, as shown in FIG. 1, an approximately conical or rounded transition is provided. At least one transverse bore 22 is made in the portion 12a of the stroke stop element 12, and through this transverse bore, the region 20c of the longitudinal bore 20 is in communication with the annular gap 14. Preferably, a plurality of transverse bores 22, distributed over the circumference, are provided in the stroke stop element 12.

The stroke stop element 12 is preferably made from hardened steel, to assure low wear, since when the check valve opens, the valve member 7 strikes the stroke stop element 12. The valve member 7 is likewise preferably made from hardened steel; conventional balls for ball bearings, which are available as standard parts, can for instance be used as the valve member 7. By means of the funnel-shaped indentation 16, the valve member 7 is centered in its reciprocal motion, and as a result it is attained that upon its closing motion, the valve member 7 strikes the valve seat 5 at least approximately centrally, so that the wear to the valve seat 5 can be kept low as well.

In the open state of the check valve, the orifice 20b of the longitudinal bore 20 in the indentation 16 in the stroke stop element 12 is closed by the valve member 7. An outflow of fluid is made possible by the annular gap 14, the at least one transverse bore 22, and the longitudinal bore 20 in the stroke stop element 12. Because of the sharp-edged transition from the orifice 20b of the longitudinal bore 20 in the indentation 16 into the throttle bore 20a, the positive displacement of fluid from the indentation 16 into the longitudinal bore 20 is made more difficult, and there is increased flow resistance there. Upon opening of the check valve, the valve member 7 enters into the indentation 16 and positively displaces fluid from it into the longitudinal bore 20. Because of the increased flow resistance, the motion of the valve member 7 is damped, so that its impact on the stroke stop element 12 is less powerful. Upon closure of the check valve, fast lifting of the valve member 7 from the stroke stop element 12 is assured, since the inflow of fluid from the longitudinal bore 20 into the indentation 16 is made possible by the streamlined transition from the region 20c to the throttle bore 20a.

Upon installation of the check valve in the valve housing 1, the valve member 7 is first introduced into the bore 3. Next, the stroke stop element 12 is inserted from the open side of the valve housing 1 into the bore 3, in the direction of the longitudinal axis 4, until the annular shoulder 13 of the stroke stop element 12 comes into contact with the annular shoulder 10 of the valve housing 1. The maximum stroke of the valve member 7 that the valve member can execute between its contact with the valve seat 5 and with the stroke stop element 12 is fixed by the axial position of the stroke stop element 12.

The stroke stop element 12 is fixed at least indirectly in the axial direction in the bore 3 of the valve housing 1 by means of a welded connection. Preferably, the stroke stop element 12 itself is joined by material engagement on its circumference to the valve housing 1 by means of a welded connection 26 in the bore 3, as shown in the upper half of FIG. 1. The check valve is disposed near the open end of the valve housing 1.

Alternatively, it can also be provided that after the insertion of the stroke stop element 12 into the bore 3, as shown in the lower half of FIG. 1, a welded ring 28 is inserted, by which the stroke stop element 12 is fixed in the axial direction and which is joined by material engagement to the valve housing 1 by means of a welded connection 30.

Figure 2:
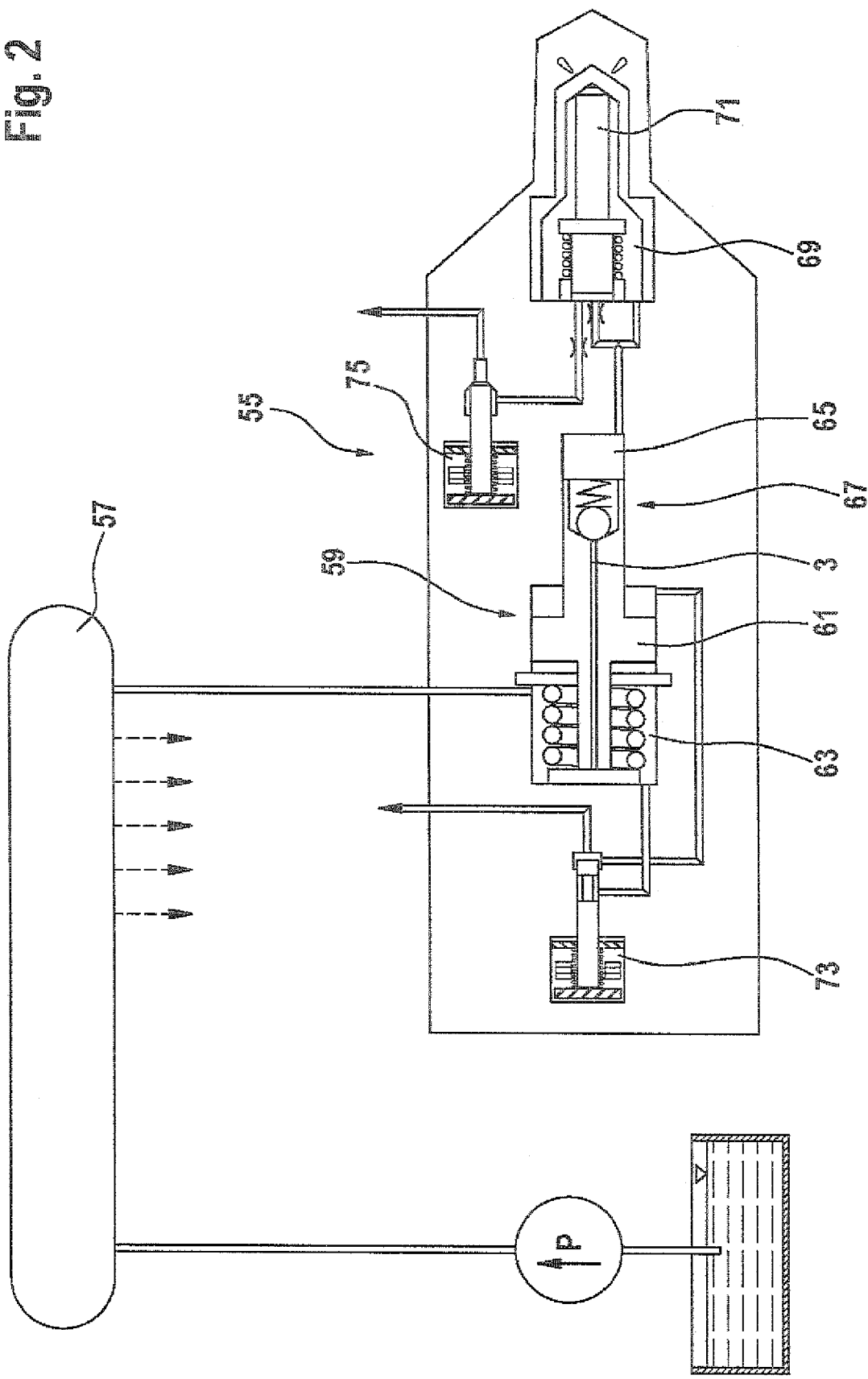
FIG. 2 is an injector of the invention with a hydraulic pressure booster and a check valve of the invention.

In FIG. 2, an example of the use of the check valve of the invention is shown schematically. An injector is identified in its entirety by reference numeral 55. The injector 55 is supplied with fuel at high pressure from a common rail 57 via a high-pressure line (not identified by reference numeral). A hydraulic pressure booster 59 is provided in the injector 55. The hydraulic pressure booster 59 includes a booster piston 61, which divides a low-pressure chamber 63 from a high-pressure chamber 65. In the booster piston 61, there is a longitudinal bore 3. In the bore 3, there is a check valve 67, shown in stylized fashion, which prevents fuel from being able to flow out of the high-pressure chamber 65 into the low-pressure chamber 63. This check valve 67 is a check valve in accordance with the exemplary embodiment of FIG. 1 described above.

The high-pressure chamber 65 communicates hydraulically with a drum 69 in which a nozzle needle 71 is disposed. Via a first magnet valve 73, which is embodied as a 3/2-way valve and which controls the hydraulic pressure booster 59, and a second magnet valve 75, which controls the pressure in the drum 69, the nozzle needle 71 is opened and closed.

The booster piston 61 is preferably made from a roller bearing steel having a carbon content of approximately 1%. The booster piston 61 is guided with very little play and has a wear protection layer on its outer surface. The heat input into the booster piston 61 in the production of the welded connection 26, 30 for fixation of the stroke stop element 12 in the bore 3 of the booster piston 61 must therefore be kept as slight as possible. As a result, the guidance play of the booster piston 61 and damage to the wear protection layer of the booster piston 61 from thermal factors in welding and/or thermal warping is minimized, and subsequent overly slight guidance play of the booster piston 61 and accordingly increased wear is avoided.

The foregoing relates to the preferred exemplary embodiment of the invention, it being understood that other variants and embodiments thereof are possible within the spirit and scope of the invention, the latter being defined by the appended claims.

The invention claimed is:

1. A check valve, comprising:
   a valve housing;
   a bore disposed in the valve housing;
   a valve seat embodied in the bore;
   a spherical valve member; and
   a stroke stop element for the valve member, on which the valve member comes to rest when the check valve is open, said stroke stop element having a continuous longitudinal bore and said longitudinal bore having an orifice,
   wherein the stroke stop element, on its side toward the valve member, has a funnel-shaped indentation, into which the valve member dips in the open state of the check valve,
   wherein said longitudinal bore, toward the indentation, has a region embodied as a throttle bore, and the orifice of the longitudinal bore into the indentation has a larger diameter than the throttle bore,
   wherein the longitudinal bore, adjoining the throttle bore on its side remote from the indentation, has a further region with a larger diameter than the throttle bore, and wherein the stroke stop element is axially fixed in the bore disposed in the valve housing at least indirectly by means of a welded connection.

2. The check valve as defined by claim 1, wherein the stroke stop element and the valve housing are made from hardened steel.

3. The check valve as defined by claim 1, wherein the stroke stop element, on its circumference in the bore, is welded to the valve housing.

4. The check valve as defined by claim 2, wherein the stroke stop element, on its circumference in the bore, is welded to the valve housing.

5. The check valve as defined by claim 1, wherein in the bore disposed in the valve housing, by means of a change of diameter of the bore, an annular shoulder facing away from the valve seat is formed, which forms a stop for the stroke stop element on which the stroke stop element upon its insertion into the bore comes to rest in an axial direction against the valve seat.

6. The check valve as defined by claim 2, wherein in the bore disposed in the valve housing, by means of a change of diameter of the bore, an annular shoulder facing away from the valve seat is formed, which forms a stop for the stroke stop element on which the stroke stop element upon its insertion into the bore comes to rest in an axial direction against the valve seat.

7. The check valve as defined by claim 4, wherein in the bore disposed in the valve housing, by means of a change of diameter of the bore, an annular shoulder facing away from the valve seat is formed, which forms a stop for the stroke stop element on which the stroke stop element upon its insertion into the bore comes to rest in an axial direction against the valve seat.

8. The check valve as defined by claim 1, wherein a transition between the throttle bore and the orifice of the longitudinal bore is embodied with sharp edges.

9. The check valve as defined by claim 5, wherein an annular gap is present in the region of the bore disposed in the valve housing between the annular shoulder and the valve seat between the stroke stop element and the bore, and at least one transverse bore connecting the annular gap to the longitudinal bore is made in the stroke stop element.

10. An injector for a fuel injection system of an internal combustion engine, having a hydraulic pressure booster, wherein in the hydraulic pressure booster, in particular in a booster piston of the hydraulic pressure booster, there is a check valve as defined by claim 1.

11. The check valve as defined by claim 9, wherein the transverse bore connects the annular gap to the further region of the longitudinal bore.

12. The check valve as defined by claim 1, wherein a transition between the throttle bore and the further region of the longitudinal bore is embodied in streamlined fashion, either approximately conically or rounded.

13. The check valve as defined by claim 1, wherein a transition between the throttle bore and the further region of the longitudinal bore is streamlined.

14. The check valve as defined by claim 1, wherein an annular gap is present in the region of the bore disposed in the valve housing between the stroke stop element and the bore, and at least one transverse bore connecting the annular gap to the further region of the longitudinal bore is made in the stroke stop element.

* * * * *